T. CAMPBELL.
Car-Brakes.

No. 146,430.　　　　　　　　　　Patented Jan. 13, 1874.

WITNESSES:
Jas. L. Ewin
Walter Allen

INVENTOR:
Tristram Campbell
By Knight Bros. Attorneys.

UNITED STATES PATENT OFFICE.

TRISTRAM CAMPBELL, OF BOSTON, MASSACHUSETTS.

IMPROVEMENT IN CAR-BRAKES.

Specification forming part of Letters Patent No. 146,430, dated January 13, 1874; application filed March 20, 1873.

*To all whom it may concern:*

Be it known that I, TRISTRAM CAMPBELL, of Boston, in the State of Massachusetts, have invented an Improvement in Car-Brakes, of which the following is a specification:

My improved brake is constructed with a system of toggle-joints and arms, moved by either a pedal or a hand-lever at either end of the car, and acting by a thrust on the centers of the brake-bars, which press the shoes or rubbers on the adjacent faces of the two pairs of wheels of the car or car-truck.

Figure 1:
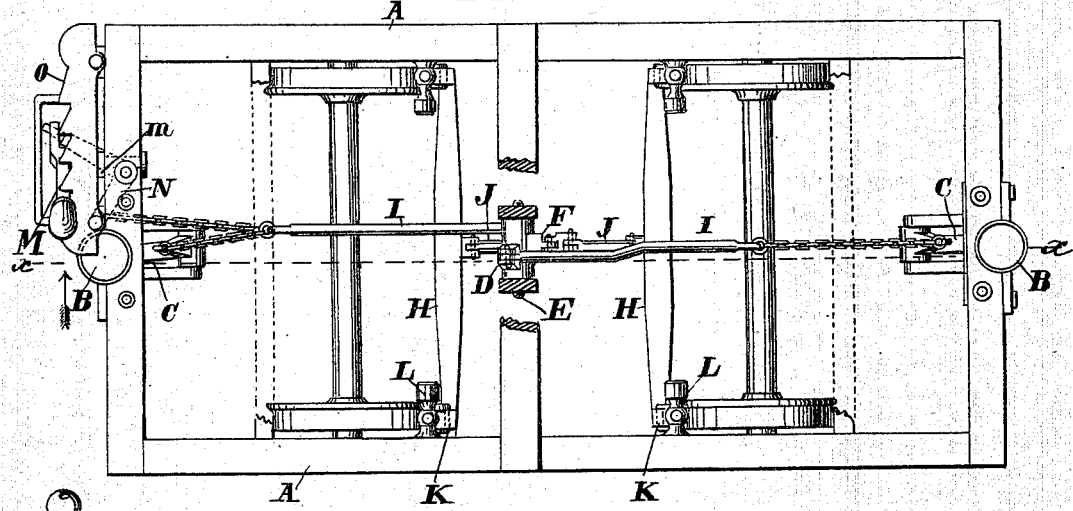
Figure 2:
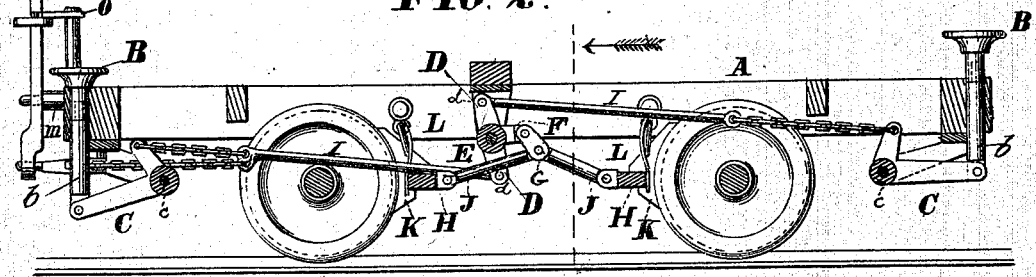
Figure 3:
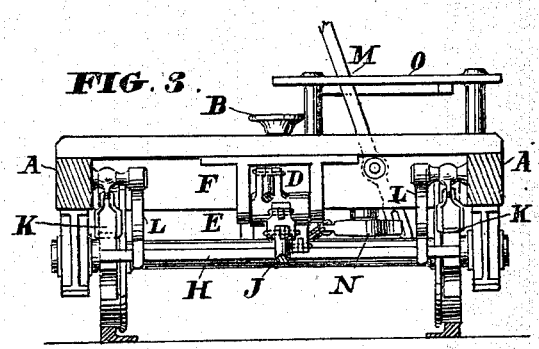

In the accompanying drawings, Figure 1 may represent a plan of a car-truck or of the running-gear of a horse-car with my invention applied. Fig. 2 is a longitudinal section on the line $x\,x$, Fig. 1. Fig. 3 is a transverse section at $y\,y$.

A A represent parts of the frame of a car or car-truck. B B are pendants, fitted removably to the upper ends of vertical rods $b\,b$, pivoted to, and employed to depress, the outer ends of arms C C, which are fulcrumed at $c\,c$ to the frame. D D are arms, projecting from a central shaft, E. The ends $d\,d$ of the arms D are connected, by rods I' I', with the inner ends of the arms C. From the shaft E projects also a third rigid arm, F, carrying at its extremity a rod, G, which is jointed to the connecting ends of the thrust-rods J J, so as to constitute a toggle-joint. The extremities of the thrust-rods J are jointed to the brake-bars H H, carrying the customary shoes or rubbers K K, and retracted by springs L L, in any usual or suitable manner.

As a substitute for the pedals B, and their arms C, or in addition thereto, I employ, if desired, hand-levers M, fulcrumed at $m$, and jointed at their ends to bell-crank arms N, which, through the medium of chains and rods I, act on the arms D, and their attachments, in the manner already described.

O O are ratchet-racks, to hold the levers M in any position in which they may be placed.

From the foregoing description, it will be understood that a pressure of the foot or hand upon the pedal B, or lever M, at either end of the car, will apply the brakes to all the wheels simultaneously, with any necessary force, through the system of toggle-joints and arms, and when released they are instantly retracted, in customary manner.

The invention is especially designed for use on horse-cars, but can be adapted to truck-cars, and used therewith without essential modification.

I do not claim, broadly, the application of the toggle principle to car-brakes; but What I do claim as new, and desire to secure by Letters Patent, is as follows:

1. The combination of the brake-bars H, thrust-rods J, arms C D F G, and connecting-rods I, constructed and arranged for actuating the brakes from either end of the car, as set forth.

2. The combination of the removable pedals B, the rods $b$, connections C D E F G I, thrust-rods J, and brake-bars H, substantially as set forth.

TRISTRAM CAMPBELL.

Witnesses:
MICAH C. CAMPBELL,
WILLIAM L. CAMPBELL.